United States Patent Office 3,362,836
Patented Jan. 9, 1968

3,362,836
PROCESS FOR PRODUCTION OF ALBUMEN
Don Scott, Skokie, Ill., assignor, by mesne assignments, to G. D. Searle & Company, Chicago, Ill., a corporation of Delaware
No Drawing. Filed Mar. 15, 1965, Ser. No. 439,984
7 Claims. (Cl. 99—210)

ABSTRACT OF THE DISCLOSURE

This application relates to a process for preparation of dry desugarized egg whites wherein the liquid egg albumen is desugarized by enzymatic action. The desugarized albumen is adjusted to pH between 8 and 10 using ammonium hydroxide and the alkalized egg whites are dehydrated to produce a dry powder which upon reconstitution exhibits a pH near neutrality.

---

This invention relates to the processing of eggs and to the egg albumen products formed by the process. More particularly, it relates to a method of preparing dried egg whites having improved whipping characteristics, etc.

The process of the present invention comprises subjecting egg whites to a processing operation such as a desugarization, adjusting the hydrogen ion concentration of the processed albumen with an alkaline material which is volatile at temperatures conventional for drying eggs, to a pH in excess of about 8 and dehydrating the pH adjusted albumen.

Numerous attempts have been made in the past to produce egg white having improved whipping characteristics and the ability to impart greater volume and lightness to bakery goods such as angel food cake, and the like. Enzymatic desugarization of egg whites has improved resistance to development of a brownish color upon drying which previously limited the commercial acceptability of dried egg whites, but the enzyme treated products exhibit whipping and other characteristics similar to egg albumen prepared by the conventional dehydration process.

For example, egg whites desugarized by enzymatic action which converts glucose to a gluconic acid, produce an albumen product having an acidic pH in the range between about 5.7 and 6.5, dependent upon the pH established at the start of the enzymatic processing. This wet product, upon drying in the conventional manner, produces a powder which, when reconstituted with distilled water, shows that a variable pH rise takes place during the drying. Not only does the pH rise during the drying, but if the pH is dropped before drying to avoid this, a portion thereof is insolubilized and precipitated so that there is a loss of up to 15% of the albumen solids.

Now it has been discovered that, dry albumen of improved properties such as lower insolubles, better whipping characteristics, etc., may be produced, if an alkaline agent selected from the group consisting of ammonia and ammonium hydroxide is added to liquid desugarized egg white in quantities to produce a pH in the range between about 8 and about 10 and then drying the alkaline albumen at temperatures which will volatilize and eliminate most of the alkaline agent so that the pH of the reconstituted dry albumen product be near neutrality, i.e., at a pH in the range between about 6.0 and about 8.0, generally between 6.5 and 7.5.

Removal of the sugar, for example from egg whites, may be accomplished in numerous ways, such as by use of yeast, or other microorganism Aerobacter, Enterococci, etc., natural fermentation, enzymes, and the like. If the desugarization is effected by a natural fermentation, the product will generally exhibit a pH of about 4.6 to 5.5. If desugarization is effected by treatment with yeasts, the pH of the treated product will generally be in the range between about 6.7 and 6.9. Accordingly, the amount of alkaline material volatile at the temperature of drying which will be required to effect a proper adjustment of pH is subject to considerable variation but regardless of the pH of the liquid albumen before alkalizing, when the product being dried has a pH in the range between about 8 and about 10, the pH of the end product is self-adjusting to near neutrality.

The invention may be illustrated through the embodiment of the invention involving enzyme desugarization of egg whites, which desugarization is considered by the industry to be complete when the residual sugar level is 0.1% dry or less, with amounts as low as 0.01% often being specified. Egg whites generally at a temperature of about 86° F. have admixed therewith an enzyme system having glucose oxidase activity. Preferably, the enzyme system is a combination of glucose oxidase and catalase. In the latter event, hydrogen peroxide is added to the medium undergoing oxidation for the purpose of supplying the necessary free oxygen through decomposition of the hydrogen peroxide by catalase to oxygen and water. In this process, the hydrogen peroxide precursor for introduction of oxygen is added in the form of successive increments, the increments containing successively decreasing amounts of hydrogen peroxide. The hydrogen peroxide may be fed continuously. After an elapsed time of about eight hours, the conversion of glucose to gluconic acid is substantially complete and the hydrogen ion concentration of the egg whites does not become appreciably greater than about pH 6.0.

Generally speaking, increased temperature up to about 104° F. may be used, but where low concentrations of enzymes are employed and a relatively long period of time is contemplated for effecting the conversion, it is often preferable to employ low temperatures in order to slow down any growth of microorganisms. Following desugarization, the hydrogen ion concentration of the egg whites is adjusted from a pH in the range of 5 to 7 to a pH in the range between 8 and 10, preferably 8.5 to 9.

Such pH adjustment for the purposes of this invention is accomplished by the use of an alkaline material which is volatile under the drying conditions. Such pH adjustment may be accomplished by passage of ammonia through the liquid egg whites or by the addition of ammonium hydroxide. When such pH adjusted liquid egg whites are subsequently dried, for example, by spray drying, the pH exhibited by the dry product upon reconstitution with distilled water shows a pH in the range between about 6 and about 8.

When it is desired to produce an albumen of improved functional properties as regards emulsification or whipping, it is advantageous to remove fat. A process of treatment for egg whites utilizing foaming during processing of the enzyme containing mixture, is an effective one for the removal of fat and other suspended materials, such as bacteria, physically from the food product. Thus, the fat which could be detrimental will not be carried through into the end product.

While it is preferred to use hydrogen peroxide in the desugarization of the egg whites, it will be apparent that other sources of oxygen may be utilized. For example, oxygen gas or air may be introduced into the reacting mixture, one mode of operation being to operate in a closed vessel with oxygen under pressure. For the purposes of this invention, it is only necessary that enough oxygen be introduced so that sugar content be eliminated, for which purpose the oxygen requirement varies inversely with enzyme concentration.

At the time of reaction, the hydrogen ion concentration of the reacting mixture has an appreciable effect on the rate of the utilization of oxygen in the reaction. For most proteinaceous mediums, it is preferred to carry out the conversion of glucose to gluconic acid at a pH generally in the range between about pH 5.0 and 7.5. For example, in the treatment of egg whites, the solids of which consist predominantly of albumin, it may be desirable to maintain the pH in the range between about 6.3 and 6.8 to minimize separation of mucin and mucoid fractions.

Adjustment of the pH of the medium prior to desugarization, when necessary, may be accomplished by the use of organic acids or inorganic acids. Useful organic acids are citric acid, lactic acid, acetic acid, and the like. Useful inorganic acids are phosphoric acid, hydrochloric acid, and the like.

In a preferred embodiment of the invention as applied to egg whites intended for use in angel food cake, citric acid is added to the egg white medium being held at a temperature of about 50° F. in quantities to produce a pH of about 7.0. If the medium consists of a 1,000 base of liquid egg whites, the adjustment requires the use of about one pound of citric acid. The medium is maintained under mild agitation conditions and to the acidified egg white is added about 600 ml. of 35% hydrogen peroxide and one standard pound of glucose oxidase enzyme (75,000 units of glucose oxidase). Thereafter, hydrogen peroxide is added incrementally or continuously. After about 10 to 14 hours of enzyme action, the desired desugarization is complete.

In view of the adverse effect of carbonates and carbon dioxide in a desugarized albumen, the pH of the desugarized product if not in the vicinity of 5, is adjusted thereto with edible organic acid while gently agitating the mixture so that elimination of carbonates is possible. The adjustment with acid is generally carried to a pH in the range between about 4.6 and 5.2. However, if the desugarized albumen is adjusted to about 5, the product has, as discussed hereinbefore, the disadvantage of insolubilizing mucins causing a loss of solids and there is little or no pH rise during drying so that a dry additive must be mixed therewith to obtain a neutral material for reconstitution. On the other hand, if the albumen is not further acidified, the further the pH is from 5.0, the greater will be the tendency for the pH to rise on drying, subject, of course, to variation due to drier temperature and hold-up time as well. This creates the problem of testing each batch of dry egg whites to determine the amount of dry additive required so that upon reconstitution, a liquid product having a pH near neutrality, will be obtained, and necessitate an extra manufacturing operation.

In accordance with this invention, the hydrogen ion concentration, i.e., pH, of desugarized liquid egg whites is adjusted to a pH in the range between about 8 and about 10, preferably to a pH in the range between about 8 and about 9. Such adjustment of pH is accomplished by means of an alkali which is volatile at temperatures useful for dehydration of egg whites without effecting coagulation of the albumens. In adjusting the hydrogen ion concentration, the pH is shifted from an acid pH to an alkaline pH. The volatile alkaline agent will be partially eliminated during the drying operation. Accordingly, the pH is raised to a point such that the dry product, upon reconstitution with water, will automatically have a pH near neutrality. Adjustment, for instance, of the liquid egg whites from pH 6.0 after desugarization to pH 9 using 28% ammonium hydroxide, followed by spray drying, results in the production of a superior albumen with a final pH, when reconstituted, of about 7.4.

Desugarized liquid egg white having a pH in the range of 8 to 10 may, if desired, be dehydrated, i.e., converted to a dry powder, for example, by spray drying, freeze drying, vacuum drying, etc. In spray drying and vacuum drying, it is necessary to control the temperature so as to avoid denaturation of the albumen. Generally, the temperature to be attained by the albumen does not exceed about 175° F.

For a more complete understanding of this invention, there is set forth a number of examples which illustrate the preparation of desugarized food products and the method by which the process of this invention may be carried out.

Example I 16,000 pounds of egg white are adjusted to 58° F. and 16 pounds of citric acid monohydrate, which was previously dissolved in 20 gallons of water, was added slowly. The pH was dropped thereby to 7.3. 10 liters of 35% hydrogen peroxide was then mixed in. After about 20 minutes 1.6 liters of glucose oxidase-catalase enzyme having 1,200,000 units of glucose oxidase was added and peroxide addition was started at the rate of 4 liters per hour for the first 3 hours. The rate of hydrogen peroxide addition was reduced to 2 liters per hour for the next 2½ hours, and to 1 liter per hour for the next 2½ hours. The peroxide rate was thereafter cut to 600 ml. per hour until a qualitative test for reducing sugar was negative. Total time for desugarization was 11 hours from the time of enzyme addition.

The pH of the desugarized egg whites was 6.3. A 100 pound portion of the egg whites was separated to provide a control. This separated portion was dried to a powder in a spray dryer having an outlet gas temperature of 120° F.

A second 100 pound portion of the egg whites was adjusted to a pH of 8 sodium hydroxide and spray dried in the equipment used to produce the control sample. When this alkali neutralized spray dried product is reconstructed with distilled water, the pH of the suspension is 9.5.

To the balance of the desugarized egg whites was added two hundred and nineteen (219) pounds of 28% ammonium hydroxide. The pH of the admixture was 9.6. The pH adjusted mixture was dried to a powder in the spray dryer used to produce the control sample described previously. When the powder product is reconstituted with distilled water, the pH of the suspension is 7.2.

The control sample and the product prepared in accordance with this invention were tested for whipping characteristics by the standard whipping test using a Hobart mixer and whipping the aliquot for a total of 3 minutes as specified. The control sample produced a froth of 5 inches while the product of this invention produced a froth of 6.2 inches, a volume increase of about 25%. The alkali-treated product was not froth tested because the pH thereof was too high to be compatible with, for example, angel food cake formulae.

The foregoing description is given for clearness of understanding only and no unnecessary limitations should be understood therefrom, for many modifications will be obvious to those skilled in the art.

I claim:

1. The process of preparing a dry albumen product comprising adjusting the hydrogen ion concentration of a liquid albumen product which has been made substantially glucose-free by reaction with a system having glucose oxidase activity and having an acidic pH at the time of initiation of pH adjustment to a pH in the range between about 8.0 and about 9.0 entirely with an alkaline material selected from the group consisting of ammonia and ammonium hydroxide and thereafter dehydrating the resultant albumen to a dry product which upon reconstitution with distilled water will have a pH near neutrality and higher than that of the enzyme desugarized albumen.

2. The process of preparing desugarized egg white comprising admixing liquid egg white with an enzyme system having glucose oxidase activity, maintaining free oxygen as a dispersed gaseous medium in said mixture for a period of time sufficient to convert glucose in said egg white to gluconic acid, adjusting the hydrogen ion concentration of the egg whites to a pH in the range between about 8 and about 10 entirely with an alkaline material selected from the group consisting of ammonia and ammonium hydroxide and thereafter dehydrating the resultant egg white.

3. The process of preparing desugarized egg white comprising adding to liquid egg white an enzyme system having glucose oxidase and catalase activity, admixing with said mixture a stoichiometric excess of hydrogen peroxide whereby oxygen is freed and the glucose in said egg white is converted to gluconic acid, adjusting the hydrogen ion concentration of the egg whites to a pH in the range between about 8 and about 10 entirely with an alkaline material selected from the group consisting of ammonia and ammonium hydroxide and thereafter dehydrating the resultant egg whites.

4. The process of preparing a dry desugarized egg albumen product which comprises adding edible organic acid to an egg albumen product which has been desugarized by reaction with a system having glucose oxidase activity in quantities to produce a pH generally in the range between about 4.6 and about 5.5 while gently agitating the mixtures, then adjusting the hydrogen ion concentration of the substantially glucose-free liquid albumen product to a pH in the range between 8 and 10 entirely with an alkaline material selected from the group consisting of ammonia and ammonium hydroxide and thereafter dehydrating the resultant albumen.

5. The process of preparing desugarized egg white comprising admixing said liquid egg whites with hydrogen peroxide and an enzyme system having glucose oxidase and catalase activities, forming free oxygen in situ in said admixture by catalase decomposition of hydrogen peroxide when the liquid egg white is being maintained at a temperature in the range between about 30° F. and about 65° F., maintaining said liquid egg whites essentially saturated with respect to oxygen, adjusting the hydrogen ion concentration of the egg whites to a pH in the range between about 8 and about 10 entirely with an alkaline material selected from the group consisting of ammonia and ammonium hydroxide and thereafter dehydrating the resultant egg white.

6. The process of preparing desugarized egg white comprising admixing liquid egg white with an enzyme system having glucose oxidase activity, maintaining free oxygen as a dispersed gaseous medium in said mixture for a period of time sufficient to convert glucose in said egg white to a gluconic acid, adjusting the hydrogen ion concentration of the egg whites to a pH in the range between about 8.5 and about 9.0 entirely with an alkaline material selected from the group consisting of ammonia and ammonium hydroxide and thereafter dehydrating the resultant egg white.

7. The process of preparing desugarized egg white comprising admixing liquid egg white with an enzyme system having glucose oxidase activity, maintaining free oxygen as a dispersed gaseous medium in said mixture for a period of time sufficient to convert glucose in said egg white to a gluconic acid, adjusting the hydrogen ion concentration of the egg whites to a pH in the range between about 8 and about 10 entirely with an alkaline material selected from the group consisting of ammonia and ammonium hydroxide and thereafter spray drying under conditions such that the maximum temperature attained by the solids is 175° F.

References Cited
UNITED STATES PATENTS

| | | | |
|---|---|---|---|
| 2,465,875 | 3/1949 | Hopkins | 99—210 |
| 2,758,934 | 8/1956 | Scott | 99—210 |
| 2,758,935 | 8/1956 | Shaffer | 99—210 |

LIONEL M. SHAPIRO, *Primary Examiner.*

HYMAN LORD, A. LOUIS MONACELL, *Examiners.*

UNITED STATES PATENT OFFICE

CERTIFICATE OF CORRECTION

Patent No. 3,362,836                        January 9, 1968

Don Scott

It is certified that error appears in the above identified patent and that said Letters Patent are hereby corrected as shown below:

Column 3, lines 21 and 22, for "1,000 base" read -- 1,000 pound base --.

Signed and sealed this 15th day of July 1969.

(SEAL)
Attest:

Edward M. Fletcher, Jr.                WILLIAM E. SCHUYLER, JR.
Attesting Officer                           Commissioner of Patents